United States Patent [19]

MacFadyen

[11] Patent Number: 5,126,934
[45] Date of Patent: Jun. 30, 1992

[54] GAS DISTRIBUTION SYSTEM

[75] Inventor: David J. MacFadyen, Bowie, Md.

[73] Assignee: Smart House, L.P., Upper Marlboro, Md.

[21] Appl. No.: 363,849

[22] Filed: Jun. 9, 1989

[51] Int. Cl.$^5$ .................. G05B 11/01; G01F 7/00; F16K 31/02; E03B 65/72
[52] U.S. Cl. .................. 364/140; 251/129.04; 364/510; 137/624.11; 137/487.5
[58] Field of Search .............. 364/131, 140, 141, 143, 364/400, 505, 509, 510; 455/3; 431/72, 22, 25, 67, 71, 78; 222/639; 340/870.02; 379/104; 137/624.12, 624.15, 624.18, 614.06, 624.11, 487.5, 624.19; 251/129.01, 129.04, 129.08

[56] References Cited

U.S. PATENT DOCUMENTS

| | | |
|---|---|---|
| 4,263,928 | 4/1981 | Kobayashi et al. |
| 4,334,258 | 6/1982 | Seeman et al. ............ 431/22 |
| 4,352,656 | 10/1982 | Michaud et al. ............ 431/72 |
| 4,530,247 | 7/1985 | Haas .................... 222/639 |
| 4,573,114 | 2/1986 | Ferguson et al. .......... 364/510 |
| 4,665,544 | 5/1987 | Honda et al. ............. 379/104 |
| 4,705,060 | 11/1987 | Goulbourne . |
| 4,749,992 | 6/1988 | Fitzemeyer et al. ........ 340/870.02 |
| 4,812,963 | 3/1989 | Albrecht et al. .......... 364/131 |
| 4,839,790 | 6/1989 | Fujimoto et al. .......... 364/143 |
| 4,866,633 | 9/1989 | Nakane et al. ............ 364/510 |
| 4,899,217 | 2/1990 | MacFadyen et al. ........ 455/3 |
| 4,930,488 | 11/1991 | Pearman et al. ........... 137/624.11 |

FOREIGN PATENT DOCUMENTS 8602431 4/1981 PCT Int'l Appl.

OTHER PUBLICATIONS

Smith, Ralph L. "Smart House the Coming Revolution in Housing" GP Publishing, Inc. (Columbia, Md.) pp. 107-111, 1988.
Patent Abstracts of Japan, vol. 10, No. 381 (M-547), Dec. 19, 1986, & JP, A, 61173022 (Fujitsu Ltd) Aug. 4, 1986.
Patent Abstracts of Japan, vol. 7, No. 41 (M-194), Feb. 18, 1983, & JP, A, 57190200 (Mitsubishi Denki K.K.) Nov. 22, 1982.

Primary Examiner—Jerry Smith
Assistant Examiner—Jim Trammell
Attorney, Agent, or Firm—Cushman, Darby & Cushman

[57] ABSTRACT

An automated gas distribution system for safely and reliably controlling the flow of gaseous fuel to gas appliances. The system implements a "closed-loop" delivery of gas, i.e., the gas is provided to a recognized appliance only when that appliance sends a valid request for gas to a control/communications subsystem. Certain conditions preclude the supply of gas despite a valid request for gas and include an appliance or system malfunction, or a command from the system operator instructing the system to ignore certain gas requests. In addition, emergency conditions, such as a fire or gas leak will also circumvent the closed-loop delivery of gas to appliances.

31 Claims, 6 Drawing Sheets

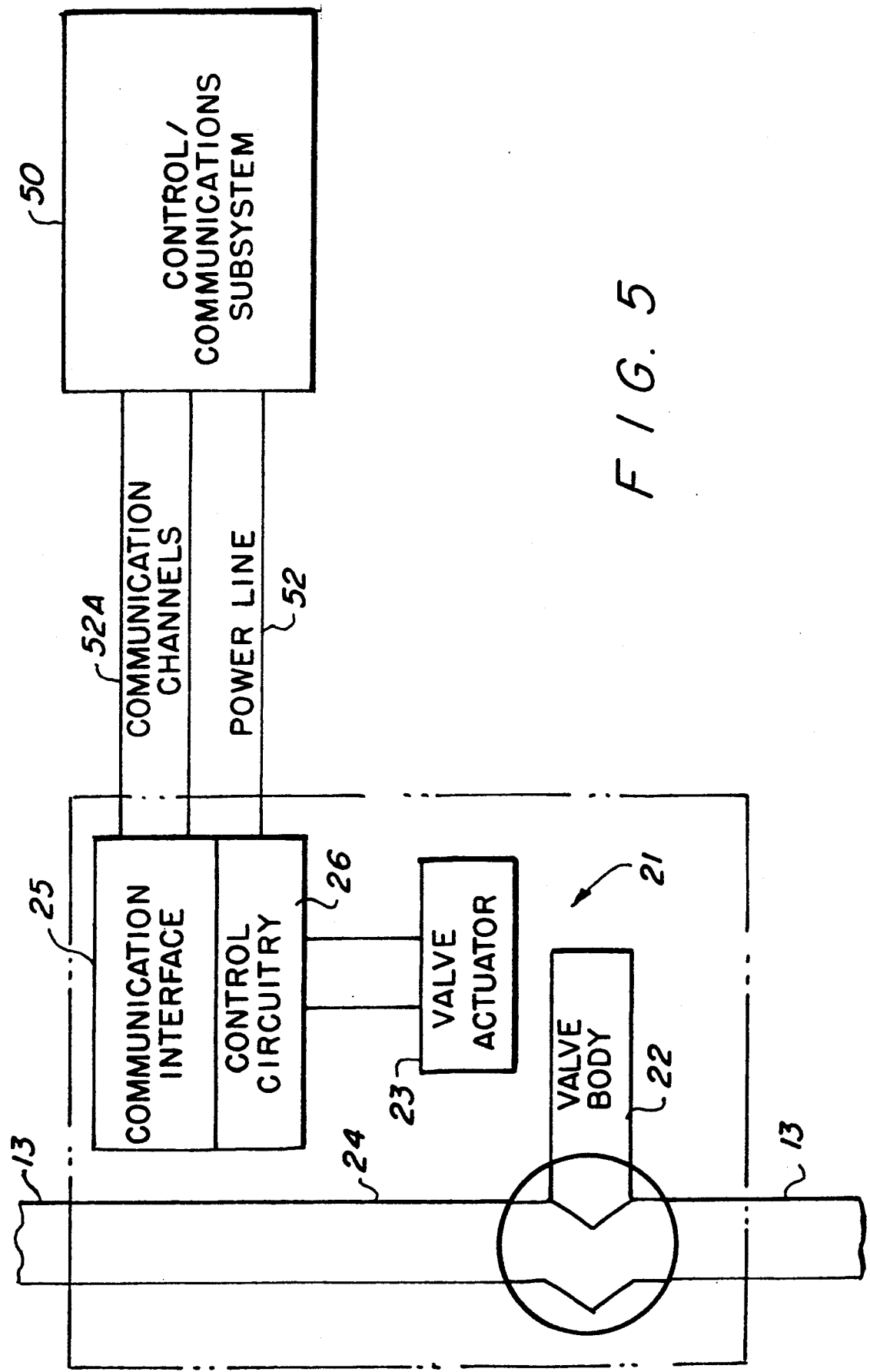

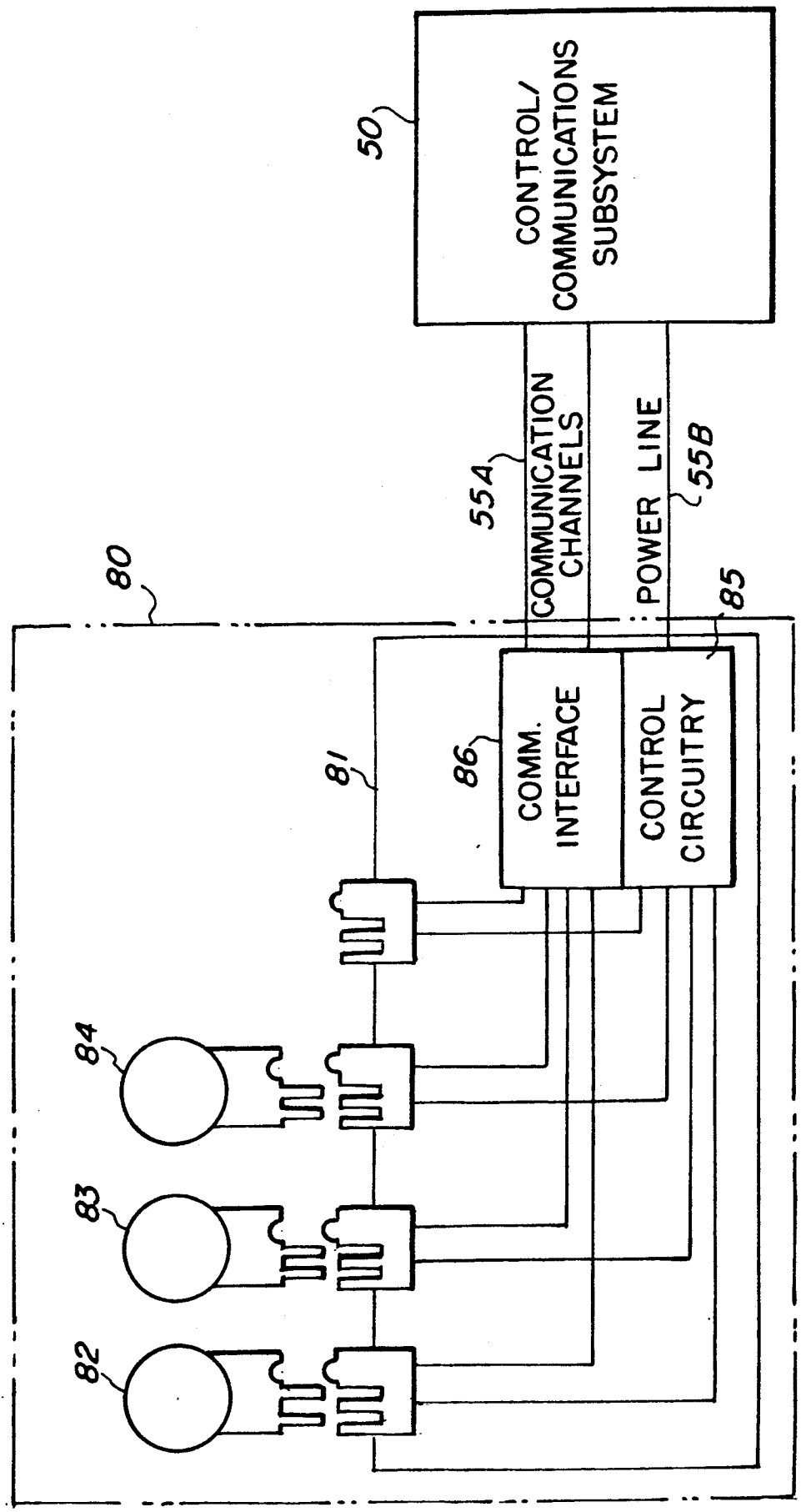

GAS DISTRIBUTION SYSTEM

BACKGROUND OF THE INVENTION

1. Field of the Invention

The present invention relates to an integrated gas distribution system for safely and reliably controlling the flow of gaseous fuel to gas appliances in a dwelling, such as a house.

2. Description of the Prior Art

Many houses today use natural gas as an energy source to fuel appliances such as stoves, ovens, dryers, furnaces, space heaters, and the like. Gas plumbing lines are used to supply gas from a service entrance, usually located outside the house, to each appliance. In a conventional gas house, the service entrance typically includes a manual shutoff valve and a pressure regulator which are required under national and local codes.

The gas distribution system in a typical house, however, cannot automatically monitor and control the flow of gaseous fuel to appliances in the house. Rather, gas fills the entire line leading to a gas point of attachment and is immediately made available to any appliance that is connected thereto. When the appliance is activated, gas flows unrestricted to the appliance regardless of whether it is in working order or of other conditions existing in the house itself.

Such a gas distribution system can create potentially serious safety hazards. One hazard involves unrestricted gas flow from the gas points of attachment. Typically, the appliances are threadably attached to a gas line. Therefore, should an appliance be disconnected without turning off the manual shutoff valve in the service entrance, gas will escape into the living space.

Another type of gas connection, found in foreign applications, employs a gas outlet having a manual valve in combination with an interlocking mechanism. The interlock prevents the valve from being activated and gas from flowing until the connector that supplies gas to the appliance has been plugged into the point of attachment. However, the interlock mechanism can be relatively easy to bypass, even by children, so that the valve can be opened manually when no appliance is connected to the attachment point, thus allowing gas to escape into the house and endangering lives and property.

Lack of a system for monitoring the flow of gas in a house creates other safety hazards. Gas leaks from the supply lines can go undetected, creating the possibility of a fire or explosion in the house.

If a gas leak does occur, it is desirable not only to sense that condition, but also, to take immediate, corrective action to avert potential disaster. Such action might include shutting down a particular gas line or the entire gas distribution system.

Conventional gas systems have no control system for automatically shutting off the gas supply in the event of an emergency, but rather, must rely on an occupant or the gas utility company to shut off the manual valve in the service entrance. By that time, however, it may be too late to avoid a disaster. Furthermore, having to rely on a manual valve for shutting down the gas supply is ineffective should a gas leak go undetected because the house is unoccupied.

Other conditions may exist in the house that require interrupting the supply of gas to appliances. For instance, should a fire break out in the house, less destruction will occur if the gaseous fuel supply to the entire house is shut off. However, during a fire or other emergency situation, there is often little opportunity to take such measures. Unfortunately, most houses are equipped solely with conventional gas/smoke detectors, which are stand-alone units capable of emitting only an audible alarm. Conventional gas systems lack the necessary monitor and control devices and communication networks for detecting emergency conditions in the house and taking the necessary corrective action in response to those conditions to minimize damage to the house and risk to the safety of its occupants.

SUMMARY OF THE INVENTION

An object of the present invention is to provide an automated system for controlling and distributing the supply of gaseous fuel to a dwelling, such as a house, more safely and reliably.

A further object of the present invention is to provide an improved gas distribution and control system that supplies gas to an appliance only after it has requested gas from the system and the conditions of the system and in the house are such that gas can be safely delivered.

Yet another object of the present invention is to provide a gas distribution system that minimizes potential safety hazards by automatically taking corrective action in case an emergency condition arises.

Yet another object of the present invention is to improve the convenience of gas usage by providing gas outlets that allow easy attachment of portable gas appliances.

Still another object of the present invention is to provide integrated control of gas appliances so that gas is used only when needed, resulting in substantial cost savings.

The gas distribution system of the present invention is one of five subsystems that comprise the SMART HOUSE core system. The other subsystems include the control/communications subsystem, the electric power distribution subsystem, the telephone subsystem, and the coaxial network subsystem. For a further description of these subsystems, reference should be made to U.S. patent application Ser. No. 126,794, the parent application, which is hereby incorporated by reference.

The gas distribution subsystem is uniquely combined with the other subsystems to provide a single, integrated home automation system. The gas distribution subsystem interfaces directly with the control/communications subsystem and an uninterruptable power supply (UPS) subsystem, which is a part of the electric power distribution subsystem, and indirectly with the telephone subsystem to provide a comprehensive, multifunctional gas control and monitoring system.

The gas distribution subsystem is designed to safely and reliably distribute gas throughout the house. To do so, the subsystem implements a "closed-loop" delivery of gas, i.e., gas is supplied to a recognized appliance only when that appliance sends a request for gas to the control/communications subsystem and the control/communications subsystem sends a signal validating the request.

Under normal conditions, the control/communications subsystem validates that request and signals an integrated control valve in a gas outlet to open and permit the flow of gas to the appliance. Under certain sensed conditions, however, the system will not open the outlet valve despite a valid request for gas by that appliance. Conditions that preclude the supply of gas include an appliance or system malfunction, or a programmed command from the system operator instructing the system to ignore certain gas requests.

In addition, emergency conditions, such as a gas leak or fire in the house, will also circumvent the closed-loop delivery of gas to appliances. Those conditions are detected using sensors and flow monitoring devices which are integrated into the gas distribution subsystem.

Under those same emergency conditions, the system also takes immediate, corrective action to avoid potential disaster. For instance, if a gas leak or fire should occur, the system signals a shutoff valve to interrupt either the supply of gas to the gas outlet, to an individual gas line, or to the whole house. During an emergency situation, the system is also capable of automatically communicating that information to the proper authorities, such as a central monitoring agency, or ideally, directly to the gas company or the fire department, through the telecommunications gateway, a key component of the telephone subsystem. This serves to bring assistance as quickly as possible and, again, minimize potential damage and loss of life.

Other objects, features, and advantages of the present invention will become more fully apparent upon consideration of the following detailed description of the preferred embodiment, appended claims, and accompanying drawings.

BRIEF DESCRIPTION OF THE DRAWINGS

FIG. 5 is a schematic diagram of the whole-house shutoff valve of the present invention interfacing with the control/communications subsystem; and FIG. 6 is a schematic diagram of the combination sensor of the present invention interfacing with the control/communications subsystem.

DETAILED DESCRIPTION OF THE PREFERRED EMBODIMENT

Figure 1:
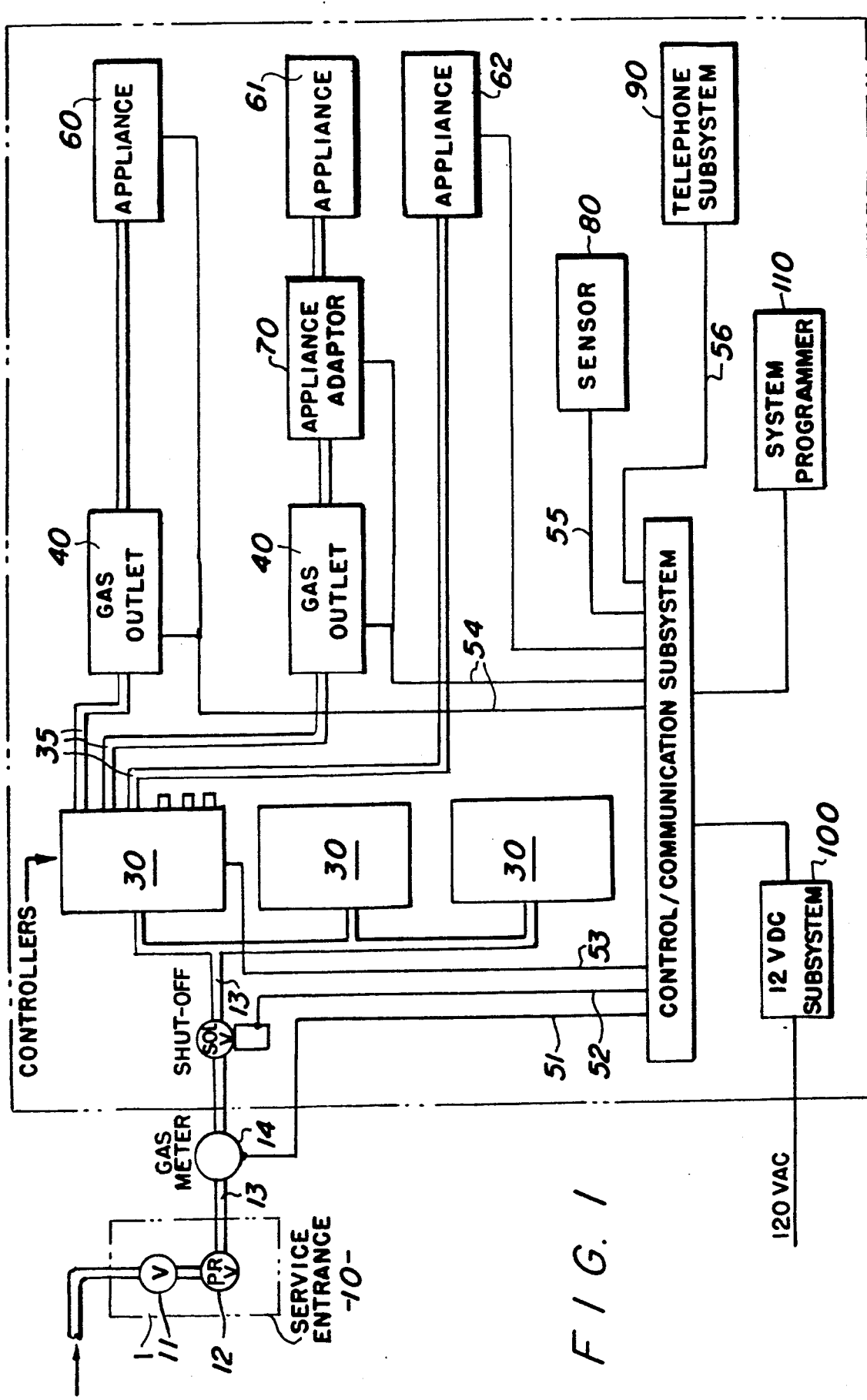
FIG. 1 is a schematic diagram of the components constituting the gas distribution subsystem of the present invention.

As shown in the schematic diagram of FIG. 1, gaseous fuel enters the distribution system through a utility service entrance 10 located outside the boundary of a dwelling, such as a house 1. Service entrance 10 includes a manual shutoff valve and a pressure regulator 12.

These components are standard devices, required by national and local codes and installed by the gas utility. Shutoff valve 11 can be manually actuated to interrupt the supply of gas to the house. Pressure regulator 12 provides gas to the house at a suitable pressure level that is in accordance with the codes and specified by the system design.

A main gas distribution line 13 runs from utility service entrance 10, to a gas meter 14, located outside the house. Optionally, gas meter 14 can be made to monitor and collect data on the cumulative, as well as instantaneous, gas usage in the house. From meter 14, gas line 13 extends into the house and connects to a whole-house shutoff valve 20 which, like manual shutoff valve 11, is capable of interrupting the supply of gas to the entire house. Valve 20, however, is a "smart" device which is an integral part of the gas distribution system of the present invention, capable of being activated automatically under certain conditions. Valve 20 is preferably located inside the house close to the point of entry of main line 13. Meter 14 and valve 20 will be discussed later in more detail.

The gas distribution subsystem of the present invention distributes gas through the house using a flexible, but rigid, corrugated piping material such as stainless steel, copper, or black steel tubing. Such pipe can be bent and taken around corners without using elbows or tees. The piping system further includes compression fittings for gas-tight connections at the functions of the various system components.

Figure 2:
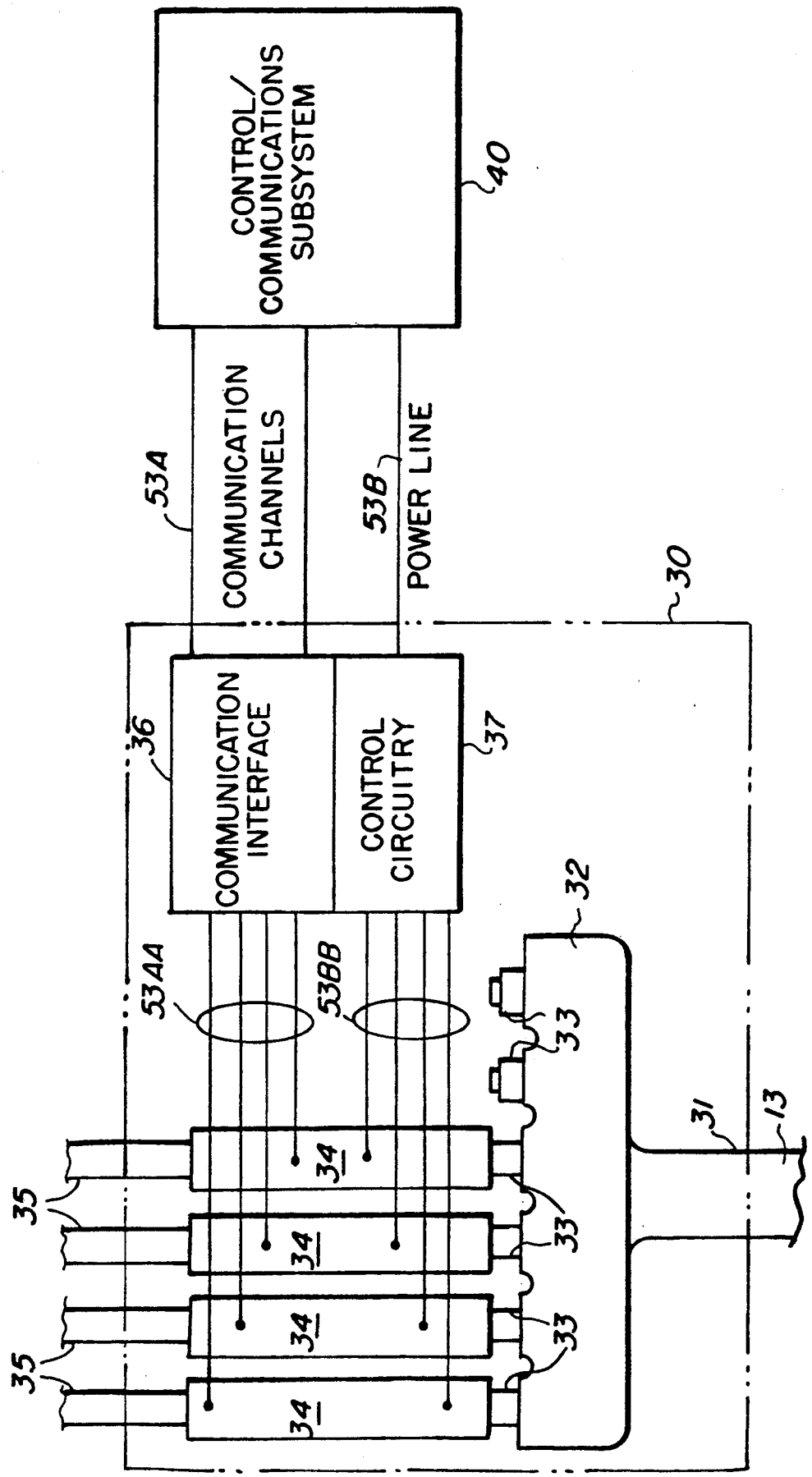
FIG. 2 is a schematic diagram of the gas branch controller of the present invention interfacing with the control/communications subsystem.

Line 13 continues from the outlet of shutoff valve 20 and branches to series of gas branch controllers 30. As shown in FIG. 2, each controller 30 includes a gas supply inlet 31 for connection to a branched end of main distribution line 13. Supply inlet 31 leads to an elongated gas manifold 32 that is provided with a plurality of parallel gas outlets 33. The construction of manifold 22 is such that gas entering inlet 31 can be split and distributed simultaneously to any of the outlets 33. Those outlets that are not in use are sealed to prevent the flow of gas therefrom, as indicated on the right side of the manifold 32 in FIG. 2.

Attached at one end to each outlet 33 is a conduit 34 that houses various monitor and control devices to be described below. The other end of each conduit 34 is adapted for connection to a respective gas home run line 35 that runs from gas branch controller 30 directly to a household appliance.

As shown in FIG. 1, main distribution line 13, between the whole-house shutoff valve 20 and branch controller 30, is the only system line that is branched. That is done to accommodate the use of additional gas branch controllers 30 in the gas distribution subsystem.

In the preferred, embodiment, a maximum of three gas branch controllers 30 are permitted in the house and each manifold 32 can accommodate up to six home run lines 35. Thus, up to eighteen attachment points are provided for appliances in the gas distribution subsystem. The actual number of gas branch controllers 30 in each house depends on the number of controlled appliances in use.

As shown in FIG. 1, the downstream end of lines 35 connect either to a gas control outlet 40 into which a household appliance is coupled, or directly to the appliance itself. The gas control outlets 40, as explained below, function as electrical and gas connection points, i.e., electric/gas connection interfaces, by which the gas-consuming appliances are connected to the gas distribution system.

The outlet 40, together with a control/communications subsystem 50, discussed in further detail hereinafter, combine to provide "closed-loop" gas delivery to the appliances. With closed-loop delivery, an appliance is supplied gas only when it sends a valid request for gas to the control/communications subsystem 50 and when conditions of the system and in the house are such that it is safe to do so.

As represented in FIG. 1, there are three types of appliances that can be used in the gas distribution subsystem. Appliance 60 is a "smart" gas appliance especially adapted to work with the gas subsystem and, thus, can be connected directly into a gas outlet 40. Appliance 61 is a "dumb" gas appliance, i.e., a conventional appliance which cannot communicate with the control/communications subsystem 50, but rather, requires a gas appliance adapter 70 to make that connection. Certain "smart" fixed-in-place gas appliances 62, such as a gas furnace or gas air conditioner, are not portable and, thus, never will be disconnected from an outlet and moved. These appliances, therefore, can be wired directly to the control/communications subsystem 50 without having to go through an outlet 40.

Figure 3:
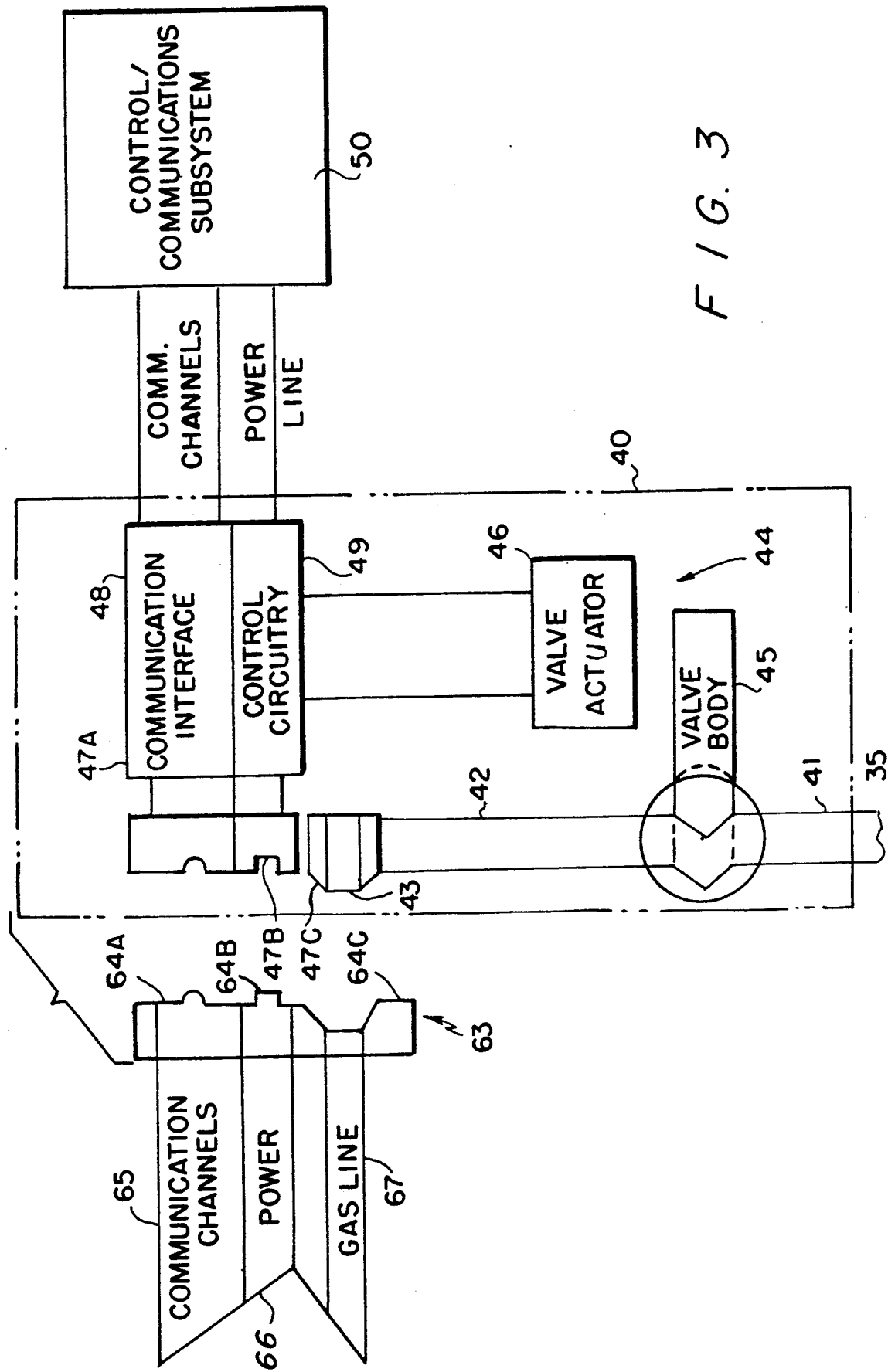
FIG. 3 is a schematic diagram of the gas outlet and appliance connector of the present invention interfacing with the control/communications subsystem.

As shown in FIG. 3, gas outlet 40 is provided with an inlet 41 adapted to receive the end of a home run line 35 extending from gas branch controller 30. A gas passageway 42 runs from the inlet to an outlet connection point 43 for connection to a gas appliance.

Gas outlet 40 is mounted inside the walls of the house using a bracket, much like an electrical outlet. The outlet connection point 43 is designed to be accessed through an opening in a face plate (not shown) mounted on the outside of the wall structure.

An integrated automatic control valve 44 is provided to regulate the supply of gas flowing through gas outlet 40 to the appliances. Valve 44 consists of a valve body 45 that moves back and forth between a seated or closed position (dotted-line) and an unseated or open position (solid-line). In its seated position, valve body 45 blocks passageway 42 and, thus, cuts off the supply of gas. A valve actuator 46 electrically regulates the movement of valve body 45 into and out of the passageway. Control circuitry 49, described further hereinafter, controls the electrical power supplied to valve actuator 46.

Control valve 44 is constructed with a "fail-safe" design. In this arrangement, valve body 45 is moved into its open, unseated position only when power is delivered to valve actuator 46 through power line 54B. Valve body 45 is spring-biased into its closed position when the power supply is diverted from actuator 46. In this way, if the system unexpectedly loses power, then the valve 44 in each outlet 40 will be forced into and remain in its closed position.

As further shown in FIG. 3, outlet 40 is provided with a "quick connect" feature for easy attachment of a gas appliance connector 63 which extends from a "smart" gas appliance 60. The connection is made by providing multiple fittings on outlet 40 including a communication interface fitting 47A, a power interface fitting 47B, and a gas supply fitting 47C. These fittings are designed to mate with corresponding fittings 64A, 64B, and 64C of appliance connector 63. Fittings 47A and 47B, along with fittings 64A and 64B establish electrical connections using, for example, pins and slots as known in the art. Gas supply fittings 47C and 64C can uses a tube to establish an enclosed area for gas flow.

Communication channels 65, power channel 66, and gas line 67 are integrated with appliance connector 63. When appliance connector 63 is connected, communication channels 65 communicate command/data signals that are generated by the appliance during operation to communication interface 48 and command/data signals from interface 48 to the appliance. Similarly, when connected, power channel 66 is electrically connected to power line 54B for transmitting electrical power.

The data transfer system allows digital transfer of information between control/communication subsystem 50 and each appliance. Control/communication subsystem 50 is a computer capable of executing the functional descriptions described hereinafter. Control/communication subsystem 50 can address each interface and appliance individually, so that data/control signals can be transferred throughout the system. Each appliance, interface, and control circuit can also be microprocessor based, if required.

This arrangement permits closed-loop delivery of gas to the appliance 60. When appliance 60 is activated, i.e., when a user requests that the device should be used, appliance 60 sends an electronic request for gas in the form of a positive demand status signal via the control/communications interface 48 of outlet 40 to control/communications subsystem 50. After subsystem 50 validates the request for gas, it signals control circuitry 49 to switch power to valve actuator 46, causing valve body 45 to shift into its unseated position and allow gas to flow to the appliance through gas line 67. Once the request has been validated and gas is supplied, subsystem 50 continues to receive data/control communication signals from the appliance. The data includes periodic positive demand status signals that indicate that the request for gas is still valid, thereby indicating that gas should still be supplied.

When the appliance is turned off, it sends a negative demand status signal to the control/communications subsystem 50. In response, the subsystem signals control circuitry 49 to divert power from actuator 46, whereby valve body 45 is biased into its closed position to interrupt the gas supply to the appliance.

The appliance 60 shown in FIG. 1, and more specifically in FIG. 3, is linked with the control/communications interface 48 in the outlet only after appliance connector 63 is fully mated with the quick-connect fittings 47A, 47B, and 47C in the outlet 40. Communication between the appliance and control/communications subsystem 50, such as a request to open gas supply valve 44, is accepted only after that link has been established. That procedure eliminates the possibility of overriding the interlock feature of the quick-connect outlet and supplying gas when no appliance is connected thereto.

Similarly, the appliance channel link is broken when the appliance connector 63 is disengaged from the quick-connect device in the outlet 40. Should that occur during operation of the appliance as gas is flowing through the outlet 40, the positive gas demand signal to control/communications subsystem 50 would be interrupted. In response, the subsystem 50 no longer signals control circuitry 49 via communication interface 48 to continue applying power to valve actuator 46 and control valve 44 is closed.

In a modification of the above-described embodiment of appliance 60 and outlet 40, closed-loop gas delivery can be implemented through the control of an automatic valve 44 that is built into the appliance itself. In that case, integrated, automatic control valve 44, interface 48, and control circuitry 49 shown in FIG. 3 would instead be located in the appliance itself. Further, outlet 40 would only have a mechanical interlocking valve which remains closed and blocks the flow of gas when no appliance is connected to the outlet. When appliance 60 is connected, the mechanical valve opens so that a gas flow path exists and gas flows through the outlet 40 up to control valve 44, which would be located in the appliance. The connection at outlet 40 would maintain the same integrated ability to process communications between the appliance and control/communications subsystem 50 as described above.

As discussed previously with reference to FIG. 3, outlet 40 is especially adapted for use with "smart" appliances. However, the system is also designed to employ conventional or "dumb" appliances that cannot transmit or receive digital communications. Such an appliance, by itself, cannot be used in the gas distribution subsystem of the present invention because it is unable to interface with control/communications subsystem 50 and to issue the proper commands required to enable the gas supply.

Figure 4:
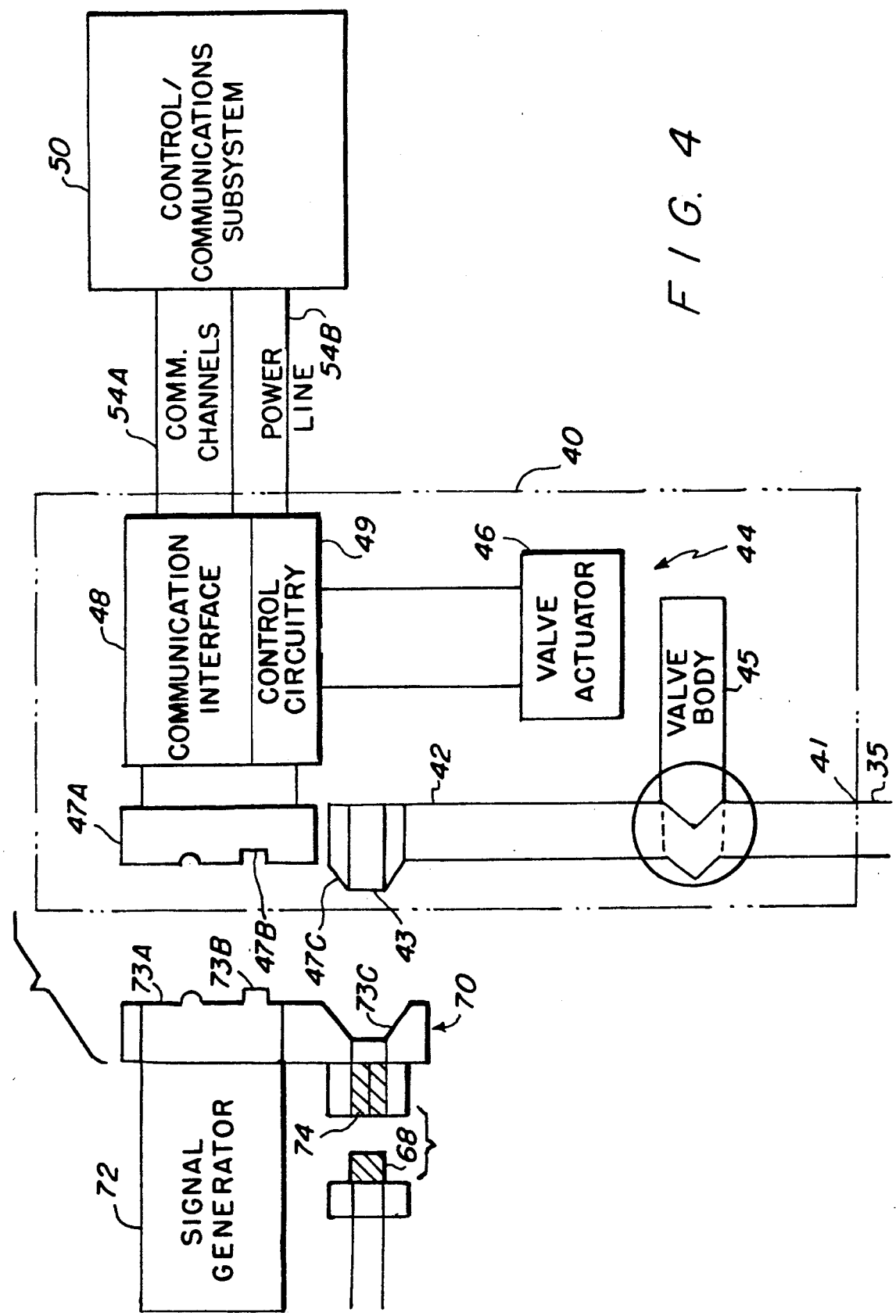
FIGURE 4 is a schematic diagram of the gas outlet and gas appliance adapter of the present invention interfacing with the control/communications subsystem.

To use a "dumb" appliance 61, as shown in FIG. 4, it is therefore necessary to employ a gas appliance adapter 70 which establishes a mechanical coupling between a connector 68 of appliance 61 and gas outlet 40. The adapter is provided with fittings 73A, 73B, and 73C, similar to those of appliance connector 63, for connection to the outlet. Fitting 74 is disposed on adapter 70 and permits a gas-tight connection to the distal end of gas line 68, which establishes the gas flow path to the appliance 61.

The adapter 70 communicates with control/communications subsystem 50 so that an appropriate request for gas can be made. When fittings 73A, 73B are properly mated to fittings 47A, 47B of quick-connect gas outlet 40, a signal generator 72 disposed within adapter 70 signals subsystem 50 that a "dumb" appliance has been connected to the outlet 40. That signal is received by communication interface 48 in outlet 40 and is sent to control/communications subsystem 50 over communication channels 54A. Signal generator 72 also sends continuous, positive demand status signals requesting gas to control/communications subsystem 50. Gas adapter 70 does not receive or transmit any other signals.

Control/communications subsystem 50 responds to the positive demand status signals by opening the control valve 44 in gas outlet 40, thereby enabling the gas to flow. When gas adapter 70 is detached from outlet 40, the valid request for gas is interrupted and, consequently, subsystem 50 signals the outlet to close the control valve, thereby ensuring closed-loop energy delivery in the gas outlet.

As mentioned above, closed-loop delivery of gas to the appliances is affected by certain conditions existing within the gas distribution subsystem. One such condition concerns the operating status of the appliances themselves.

A "smart" appliance 60 could have the capability of performing self-diagnostic routines to ensure that the appliance is operating properly. If the results of those diagnostics indicate that the appliance is malfunctioning, that information is transmitted to control/communications subsystem 50, whereby any request for gas by that appliance is ignored and valve 44 in outlet 40 will remain closed or, if open, will be caused to close.

Another feature of the present invention is the ability for the system operator to override the closed-loop delivery of gas to an appliance in response to a programmed command instructing the system to ignore certain gas requests. For instance, adults who must leave young children at home unattended may want to instruct the system to ignore any gas demand signal from certain gas appliances, such as a stove or oven, during the time they are away from home. Such instructions could be programmed into the system through use of a simple touch-pad device 110 (FIG. 1) that communicates those instructions to subsystem 50.

Closed-loop delivery of gas is also affected by conditions existing outside the gas distribution subsystem. The subsystem is capable of detecting gas leaks and other hazardous conditions existing in the house and taking corrective actions in response to those conditions.

The gas branch controller 30 is one monitor and control device for performing many of those functions. Gas branch controller 30 contains a variety of devices for monitoring and controlling the gas delivery in individual home run distribution lines 35. As shown in FIG. 2, those monitor/control devices are located in tubular conduits 34 which are connected to outlet ports 33 of manifold 32. Such devices include proof-of-flow devices, pressure sensors, control valves, and metering devices.

In addition, gas branch controller 30 is provided with communication interfaces 36. Each communication interface 36 monitors the status information of the monitor/control devices in a tubular conduit 34. All monitor/control devices within a conduit 34 communicates directly with control/communications subsystem 50 through a communication channel 53AA, an interface 36, and communication channels 53A. Gas branch controller 30 also has appropriate control circuitry 37 which acts on signals from communication interface 36 to control power sent along power lines 53BB to monitor/control devices within a conduit 34. Power for each monitor/control device can then be individually controlled by control circuitry 37. Electrical power is relayed to gas branch controller 30 via power line 53B.

In this arrangement, each interface 36 communicates to control/communication subsystem 50, via communication channels 53A, all data needed outside the gas branch controller 30 as determined by the system logic, such as sensor information to determine if an emergency condition exists.

Leak detection is one of the essential functions performed by the monitor/control devices. The proof-of-flow devices in each conduit 34 provide one means for detecting gas leaks. These devices continually provide status information to communication interface 36 of gas branch controller 30 indicating whether or not there is a positive gas flow in an individual home run line 35. The interface 36 simultaneously collects information through control/communications subsystem 50 indicating the gas demand status of the appliance attached to that line.

During normal operation, status information indicating a request for gas from an appliance should coincide with status information indicating positive flow from the proof-of-flow device on the home run 35 to that appliance. Likewise, status information from the appliance indicating that it is shut off and is not requesting gas should coincide with status information indicating no flow from the proof-of-flow device.

If, however, status information from the appliance indicates it is turned off and is not requesting gas, but the status information from the proof-of-flow device indicates a positive gas flow, control/communication subsystem 50 interprets that information as a gas leak. Upon receipt of that leak signal, control/communications subsystem 50 is programmed to take immediate, corrective action by signalling, via communication channels 52A, whole-house shutoff valve 20 to interrupt the gas supply to the house.

Alternatively, the subsystem could signal control valve 44 located in outlet 40 to close, thus shutting off the supply of gas only in the area of the home in which gas is leaking or signal a warning alarm.

Various combinations of monitor and control devices can be used.

In one embodiment, with the use of the optional control valve in each conduit 34 of branch controller 30, the ability would exist to control the gas flow into a home run 35. Control circuitry 37 then receives command signals from control/communication subsystem 50 via interface 36 to determine whether the control valve located in conduit 34 should allow gas to flow or not.

One specific use of this optional control valve would be to provide a back-up or an optional substitute for valve 44 used in gas outlet 40 when an appliance makes a valid request for gas. If control/communication subsystem 50 receives status information from an appliance indicating it is turned on and is requesting gas, then the control/communication subsystem 50 signals control circuitry 37 via interface 36 to energize the control valve and the proof-of-flow device will indicate a positive flow. If control/communication subsystem 50 receives status information from the appliance indicating it is shut off and, thus, is no longer requesting gas, the subsystem 50 signals to control circuitry 37 to disable power to the control valve so that, like the other valves in the system, the valve will be biased closed.

Furthermore, interface 36 could be microprocessor based and able to process data from each monitor in a conduit 34, as well as from other sensor devices and appliances, to independently determine if the control valve should be open or closed.

In another embodiment a metering device installed in conduit 34 monitors the volume of gas flowing to an individual appliance, rather than just the existence of gas flow indicated by a proof of flow device. Where a "smart" appliance is being used, the system knows precisely how much gas that appliance is requesting and compares that amount to the actual amount of gas flowing through the home run line 35 leading to the appliance. Where there is a discrepancy between the amount of gas requested by the appliance and measured by the metering device, the system senses a leak and enters a shutdown mode.

In another embodiment, a pressure sensor could be used to detect leaks in the gas distribution subsystem. In that case, the pressure sensor monitors the delivery pressure of gas through a home run line 35. The system is programmed to interpret a pressure drop in the line as a gas leak and respond in kind.

In another embodiment, a metering device and pressure sensor could both be used to provide a more sophisticated level of closed-loop gas delivery to the appliances in the system. For instance, where a "smart" gas appliance is used, it could be designed to request a specific amount of gas at a certain pressure. Upon verifying the request, subsystem 50 would signal gas branch controller 30, using these monitoring devices and a variable control valve, to deliver to the appliance the precise amount of gas at the appropriate pressure.

As mentioned, when one of the monitor/control devices detects an emergency condition, it can cause whole-house shutoff valve 20 to interrupt the supply of gas to the entire house. FIG. 5 shows a schematic diagram of the whole-house shutoff valve 20 and its connection to control/communications subsystem 50.

Whole-house shutoff valve 20 includes an automatic, "fail-safe" control valve 21, similar to that disclosed in connection with gas branch controller 30 and outlet 40, to regulate the supply of gas to the system. Valve 20 consists of a passageway 24 connected at one end to main line 13 where it enters the house. A valve body 22 is adapted to move into and out of the passageway 24 between a seated or closed position and an unseated or open position. A valve actuator 23 is provided to electrically regulate the movement of valve body 22.

In its seated position, valve body 22 blocks passageway 24 to cut off the supply of gas to the entire house. In its unseated position, the valve body 22 clears the passageway 24, allowing gas to flow unobstructed through main line 13.

The whole-house shutoff valve 20 is provided with communication interface 25 which receives command data from control/communication subsystem 50 and transmits it to control circuitry 26, which, in turn, switches power supplied over power line 52B to valve actuator 23 for controlling the movement of valve body 22.

Control circuitry 26 further provides component diagnostic and status information to the control/communication subsystem 50 via interface 25, such as whether valve 21 is open or closed. To that end, control circuitry 26 is capable of executing diagnostic logic to verify that all component circuitry is operating properly and that valve body 22 is in its correct position. Component malfunctions interrupt the execution of this logic and cause generation of a component malfunction signal indicating the occurrence of a component malfunction to control/communication subsystem 50. Any deviation from the standard outcome of the executed logic is interpreted as a component malfunction and causes valve 21 to close.

Under normal operating conditions, control/communications subsystem 50 sends an electronic command to control circuitry 26 via interface 25 to switch power to actuator 23 and open valve body 22. If an emergency condition is detected, subsystem 50 sends a command through communication interface 25 instructing control circuitry 26 to discontinue power to, and as a result, close the valve 24.

Such emergency conditions include gas leaks which, as disclosed above, can be detected by the various monitor/control devices housed in gas branch controller 30. Emergency conditions are also detected by combination sensor 80 (FIG. 6) located in strategic positions, preferably at least one location on each floor of the house. Possible emergency conditions which would result in shutting off the gas supply include a fire or gas leak in the living space.

FIG. 6 shows a schematic of combination sensor 80 and its connection with control/communications subsystem 50. Sensor 80 consists of a modular body 8 into which various sensing elements 82, 83, and 84 are received. These sensing elements detect dangerous levels of contaminants such as smoke and carbon monoxide, which indicate the presence of a possible fire in the house, and fuel gases indicating a possible gas leak. Communication interface 86 receives status signals (i.e. whether contaminants have been sensed, the level of contaminants sensed, or other related information) from sensing elements 82, 83, and 84 and transmits those signals to control/communications subsystem 50.

Control circuitry 85 processes signals received from control system 50 via communication interface 86, which for most sensors will typically be only power on/off signals.

Combination sensor 80 sends alarm and status information to control/communications subsystems 50 on a regular basis via communication channels 55A. Power is supplied to sensor 80 through power line 55B. If the sensing elements detect the presence of any contaminants, control circuitry 85 sends an appropriate emergency signal through communication interface 86 to control/communications subsystem 50.

Sensors 80 are capable of detecting gases or smoke at a specified low level "warning" concentration and detecting gases at a specified high level "alarm" concentration. Depending on the level sensed by an individual sensing element 82, 83, or 84, control circuitry 85 can forward the proper signal to control/communication subsystem 50. For instance, a high level alarm can cause whole house shutoff valve 20 to be closed, whereas a low level warning would only cause certain other valves to close or the issuance of a warning signal.

Subsystem 50 interprets the signals from a plurality of sensors 80 and determines whether the gas supply should be interrupted. For example, during an actual fire, several combination sensors 80 might detect carbon monoxide and/or smoke. The associated control circuitry 85 would interpret signals from the associated sensing element as a fire and send such signals via interfaces 86 to the system by way of communication channels 55A. The program logic of control/communication subsystem 50 interprets that signal as a fire and then takes immediate, corrective action.

As shown in FIG. 5, subsystem 50 can take corrective action by sending a signal through communication channels 52A to communication interface 25 of wholehouse shutoff valve 20 instructing control circuitry 26 to discontinue power to valve actuator 23 which causes valve body 22 to close and interrupt the gas supply to the house.

Control/communication subsystem 50 can also be programmed to automatically place a call to the fire department or a central monitoring agency, through a telephone subsystem 90 (FIG. 1), alerting them of a fire in the house.

If, however, there is a low level of contaminants in the living space caused, for example, by smoke and gases straying from a burning fireplace, the corrective action of control/communications subsystem 50 would not interpret that condition as a fire and, thus, would not shut down the supply of gas to the house. Rather, it would merely issue a warning which could be made known to occupants of the house by way of an audible warning signal or a visible warning light on a control panel.

Combination sensor 80 (FIG. 6) is also capable of executing self-diagnostics, which evaluate the component for proper operation, and signalling subsystem 50 in the event of a component malfunction. Sensor 80 further monitors the lifetime of individual sensing elements and signals the system when a sensing element has expired, or when it is within three months of its expected expiration date and, thus, should be replaced.

In addition to the safety features provided by the gas distribution subsystem, there are also several important utility functions built into the present invention. As mentioned previously, the gas distribution subsystem includes, along main gas line 13, a "smart" gas meter 14. The "smart" meter functions as the utility accessible billing meter which provides cumulative and instantaneous gas usage in the house.

As represented in FIG. 1, meter 14 includes a control/communications interface which communicates that information to control/communications subsystem 50 by way of communication channels 51. Subsystem 50 allows meter 14 to be read through telephone subsystem 90 so that a gas utility can automatically ascertain the gas usage in the house without having to manually read the gas meter.

Data collected from meter 14 is also useful in identifying abnormal gas flow into the house. If abnormal gas flow is detected, meter 14 issues an emergency signal via communication channels 51 to control/communications subsystem 50. Subsystem 50 processes that signal and, in turn, sends the appropriate signal via communication channels 52A instructing valve 20 to shut down the fuel supply to the house.

Another feature of the present invention is the capability of relaying messages to the gas distribution subsystem from a remote location. This is accomplished through telephone subsystem 90. Thus, if the system operator wants to control certain gas appliances, such instructions can be transmitted to the system using the keys of a standard touchpad telephone. Telephone subsystem 90, through communication channels 56, puts the caller in communication with subsystem 50, which can then be programmed with the appropriate instructions.

For instance, the system can be remotely instructed to issue a shutdown signal to cut off the supply of gas to an appliance that was inadvertently left on, or to the entire house if desired. Similarly, the system operator, before returning home, could call up the system and leave instructions to turn on an appliance, such as a command to preheat a gas oven at a prescribed 10 time and temperature.

Another feature of the instant invention relates to the power distribution of the gas subsystem. As represented in FIG. 1, all gas system components operate from a 12 VDC, uninterruptable power source (UPS) subsystem 100. Power from subsystem 100 is distributed to the components through power lines from control/communications subsystem 50.

During normal operation, UPS subsystem 100 rectifies a 120 VAC power input entering the house into a 12 VDC power source for operating the various valves and other monitor/control devices. The 120 VAC power supply is also converted to 5 VDC for powering the communication interfaces and control circuitry used throughout the system.

In case of a power outage, a plurality of lead-acid, 12-volt batteries are available to provide sufficient energy to power the gas distribution subsystem for 24 hours. The gas subsystem is designed to conserve battery power during a sustained power outage. As the UPS battery power is drained, power is supplied to the gas system components on a priority basis whereby control/communications subsystem 50 selectively shuts down all low priority or non-essential appliances. Control/communications subsystem 50 is programmed to signal a shutdown of all energy consuming devices on home run lines leading to a non-essential appliance. Communication interface 36 located in gas branch controller 30, receiving that command, would signal control circuitry 37 to disable power to any monitor/control device located in conduit 34 regardless of the status information received from the appliance on that line.

Although the invention has been described in connection with what is presently considered to be the most practical and preferred embodiment, it is to be understood that the invention is not limited to the disclosed embodiment, but rather, is intended to cover various modifications and equivalent arrangements.

For example, communication channels 51-56 are illustrated in FIG. as being physically separate communication channels. However, each of the interfaces addressed by these communication channels could be connected using a common communication bus, in which case control/data signals for the whole gas system would be multiplexed on the same common communication bus.

Thus, the spirit and scope of the present invention should be interpreted by the following claims.

What is claimed is:

1. A gas distribution system for delivery of gaseous fuel from a source into and throughout a dwelling in the absence of emergency conditions such as gas leaks and fires to a plurality of appliances, at least one of the appliances being capable of generating digital signals including periodic gas request signals, said system also inputting electrical power from a power source, comprising:
    means for inputting gaseous fuel into a dwelling to cause a gas flow;
    means for splitting said input gaseous fuel into a plurality of gas flow paths;
    first electrically operable valve means disposed between said inputting means and said splitting means for controlling gas flow between said inputting means and said splitting means;
    outlet means for connectable attachment of gas and said digital signals to an appliance, said outlet means comprising:
    a gas inlet connected to at least one of said plurality of gas flow paths,
    a gas outlet connectable an appliance, second electrically operable gas valve means disposed between said gas inlet and said gas outlet for controlling said gas flow between said gas inlet and said gas outlet, and
    an outlet communication channel providing an electrical path for said digital signals from a connected appliance; and
    means for electronically controlling said first and second valve means, said controlling means electrically connectable to an appliance through said outlet communication channel and electrically connected to said first valve means opens to allow gas flow only after said controlling means receives said gas request signal from a connected appliance.

2. A gas distribution system according to claim 1 further comprising: an appliance connected to said outlet means, wherein said one appliance periodically generates subsequent gas request signals to said controlling means to cause said second valve means to stay open.

3. A gas distribution system according to claim 1 wherein said first and second electrically operable valve means comprise:
    a valve member moveable between a seated and an unseated position for restricting and permitting gas flow;
    actuating means for moving said valve member between said seated an unseated position upon input of said electrical power from said power source; and
    wherein said controlling means further comprise control circuit means disposed in said valve means for switching said electrical power to said actuating means to cause movement of said valve member between said seated and unseated position in response to said gas request signal.

4. A gas distribution system according to claim 3 wherein said second valve means further comprises means for biasing said valve member into said seated position in the absence of said periodic gas request signals and said electrical power being supplied to said actuating means.

5. A gas distribution system according to claim 4 wherein said biasing means comprises a spring.

6. A gas distribution system according to claim 1 wherein said outlet means further comprises a power line for connectable attachment of said electrical power from said power source to said appliance.

7. A gas distribution system according to claim 6 wherein said outlet means comprises:
    a housing;
    a first plurality of one of metal slots and pins disposed in said housing capable of transmitting said digital communication signals;
    a second plurality of one of metal slots and pins disposed in said housing for transmitting electrical power; and
    a gas supply opening disposed in said housing through which said gaseous fuel can flow.

8. A gas distribution system according to claim 1 wherein said splitting means comprises:
    a splitting means gas input connected to said inputting means;
    an open chamber disposed within said splitting means and connected to said splitting means gas input;
    a plurality of splitting means gas outlets connected to said open chamber so that gas can flow through each splitting means gas outlet to one of said gas flow paths.

9. A gas distribution system according to claim 8 wherein at least one of said splitting means gas outlets contains a third electrically operable valve means for controlling gas flow, and wherein said controlling means is electrically connected to and controls said third valve means.

10. A gas distribution system according to claim 8 wherein, disposed within at least one of said splitting means gas outlets, is a means for sensing gas flow electrically connected to said controlling means.

11. A gas distribution system according to claim 10 wherein said gas flow sensing means is a gas meter for measuring the quantity of gaseous fuel flowing through said one splitting means gas outlet.

12. A gas distribution system according to claim 1 further comprising:
    means for sensing said gas leak; and
    wherein said controlling means further comprises control circuit means disposed in said sensing means for generating a gas leak signal in response to said sensed gas leak; and
    wherein said controlling means generates a gas shut-off signal to said first valve means to cause closure of said first valve means and prevent gas flow.

13. A gas distribution system according to claim 12 wherein said sensing means detects smoke.

14. A gas distribution system according to claim 12 wherein said sensing means detects carbon monoxide.

15. A gas distribution system according to claim 1 further comprising means for manually preventing gas flow through said inputting means.

16. A gas distribution system according to claim 1 further including a means for regulating a supply pressure of said gaseous fuel through said inputting means.

17. A gas distribution system for the delivery of a gaseous fuel from a source into a dwelling to at least one gas-consuming appliance of the type that provides a gas-request signal, comprising:
- means for inputting a gaseous fuel into a dwelling for distribution therein;
- means for splitting the gaseous fuel from said inputting means into a plurality of gas flow paths;
- electrically operable valve means between said inputting and splitting means for selectively controlling the gas flow therebetween in response to an electric signal;
- an electric/gas connection interface coupled to each of said gas flow paths for effecting an electric/gas connection with a gas-consuming appliance, said connection interface including a gas port for delivering gas to a gas-consuming appliance and an electrical connector for effecting an electrical connection with a gas-consuming appliance, and normally closed electrically operable valve means for selectively controlling the gaseous flow to said gas port; and
- means for controlling said first-mentioned and second-mentioned valve means for supplying gas to said gas-consuming appliance connected to said electric/gas connection interface in response to gas-request signal provided by said appliance through said connection interface, said means for controlling at least providing an electric signal to said second-mentioned valve to effect opening thereof.

18. The gas distribution system of claim 17, wherein said controlling means interrupts power to said second-mentioned valve to interrupt the gas flow in the absence of a gas-request signal.

19. The gas distribution system of claim 17, wherein said gas-request signal is provided on a periodic basis.

20. The gas distribution system of claim 17, wherein said gas-request signal is provided on a periodic basis subsequent to the attachment of said gas-consuming device to said electric/gas connection interface.

21. The gas distribution system of claim 17, further comprising:
- sensor means for sensing at least one of a plurality of undesired conditions and for communicating the undesired condition to said controlling means.

22. The gas distribution system of claim 21, wherein said controlling means controls at least one of said first-mentioned or second-mentioned valves to interrupt the gas flow in response to a sensed undesired condition.

23. The gas distribution system of claim 22, wherein said controlling means interrupts power to said second-mentioned valve to interrupt the gas flow in response to a sensed undesired condition.

24. A gas distribution system for the delivery of a gaseous fuel from a source into a dwelling to at least one gas-consuming appliance, comprising:
- means for inputting a gaseous fuel into a dwelling for distribution therein along at least one gas flow path;
- electrically operable valve means in said gas flow path for selectively controlling the gas flow therein in response to an electric signal;
- an electric/gas connection interface coupled to said gas flow path for effecting an electric/gas connection with said gas-consuming appliance, said connection interface including a gas port for delivering gas to said gas-consuming appliance and an electrical connector for effecting an electrical connection with said consuming device, and electrically operable valve means for selectively controlling the gas flow to said gas port;
- an adaptor for connection between said gas-consuming appliance and said electric/bas connection interface, said adaptor including a gas-flow throughpath for connection between said gas port and the gas-consuming appliance and a signal generator for providing a gas-request signal and
- means for controlling said first-mentioned and second-mentioned valve means for supplying gas to said gas-consuming appliance connected through said electric/gas connection interface and said adaptor in response to said gas-request signal provided by said signal generator.

25. The gas distribution system of claim 24, wherein said controlling means interrupts power to said second-mentioned valve to interrupt the gas flow in the absence of a gas-request signal.

26. The gas distribution system of claim 24, wherein said second-mentioned valve is biased to a normally closed position and opened by said controlling means in response to a gas-request signal provided by said signal generator.

27. The gas distribution system of claim 24 wherein said gas-request signal is provided on a periodic basis.

28. The gas distribution system of claim 24, wherein said gas-request signal is provided on a periodic basis subsequent to the attachment of said gas-consuming appliance to said electric/gas connection interface.

29. The gas distribution system of claim 24, further comprising:
- sensor means for sensing at least one of a plurality of undesired conditions and for communicating the undesired condition to said controlling means.

30. The gas distribution system of claim 29, wherein said controlling means controls at least one of said first-mentioned or second-mentioned valves to interrupt the gas flow.

31. The gas distribution system of claim 30, wherein said controlling means interrupts power to said second-mentioned valve to interrupt the gas flow in response to a sensed undesired condition.

* * * * *